United States Patent [19]
Brown

[11] Patent Number: 5,763,001
[45] Date of Patent: Jun. 9, 1998

[54] RESURFACED CARPET AND PROCESS FOR MAKING THE SAME

[76] Inventor: C. Noel Brown, Rte. 1, Box 82 M, North Augusta, S.C. 29841

[21] Appl. No.: 633,202

[22] Filed: Apr. 16, 1996

Related U.S. Application Data

[62] Division of Ser. No. 412,559, Mar. 29, 1995, abandoned.

[51] Int. Cl.$^6$ .................................................. B32B 35/00
[52] U.S. Cl. .......................... 427/140; 264/129; 427/386; 427/389.9; 428/85; 428/96
[58] Field of Search .................... 427/389.9, 393.4, 427/140, 386; 264/129; 428/85, 96

[56] References Cited

U.S. PATENT DOCUMENTS

| | | | |
|---|---|---|---|
| 3,042,564 | 7/1962 | Hankins | 154/49 |
| 3,481,821 | 12/1969 | Brunner et al. | 161/53 |
| 3,574,106 | 4/1971 | Bragg | 161/53 |
| 3,860,469 | 1/1975 | Gregorian et al. | 156/83 |
| 4,034,134 | 7/1977 | Gregorian et al. | 428/86 |
| 4,081,579 | 3/1978 | Queen et al. | 428/957 |
| 4,282,051 | 8/1981 | Terpay | 156/71 |
| 4,337,283 | 6/1982 | Hass, Jr. | 428/17 |
| 4,563,378 | 1/1986 | Roth | 428/86 |
| 4,582,554 | 4/1986 | Bell et al. | 156/247 |
| 4,721,642 | 1/1988 | Yoshimi et al. | 428/90 |
| 4,888,228 | 12/1989 | Sidles | 428/86 |
| 4,942,074 | 7/1990 | Bell et al. | 428/95 |
| 5,030,497 | 7/1991 | Claessen | 428/95 |
| 5,108,826 | 4/1992 | Fujiki | 428/212 |
| 5,230,473 | 7/1993 | Hagguist et al. | 241/3 |
| 5,520,962 | 5/1996 | Jones | 427/393.4 |
| 5,558,916 | 9/1996 | Heins et al. | 427/393.4 X |

*Primary Examiner*—Michael Lusignan
*Attorney, Agent, or Firm*—Troutman Sanders LLP

[57] ABSTRACT

A process for resurfacing carpet, as well as the resurfaced carpet made by this process, is provided. The process generally includes coating the pile fiber carpet surface with a polymer compound. In one embodiment, the pile fiber carpet surface of the carpet is coated with a thermoplastic material. The coated carpet is then heated to fuse the thermoplastic material to the pile fiber carpet surface. Finally, the coated carpet is cooled to harden the thermoplastic material and form a hardened surface on top of the pile fiber carpet surface. In another embodiment, the pile fiber carpet surface of the carpet is coated with a thermoset material. For this embodiment, after the thermoset material has cured, a hardened surface is formed on top of the pile fiber carpet surface.

12 Claims, 2 Drawing Sheets

RESURFACED CARPET AND PROCESS FOR MAKING THE SAME

This application is a division of U.S. patent application Ser. No. 08/412,559, filed Mar. 29, 1995, now abandoned.

BACKGROUND OF THE INVENTION

1. Technical Field

This invention relates generally to resurfaced carpet. Particularly, this invention relates to resurfacing the pile fiber surface of carpet with a polymer compound in order to reutilize the carpet.

2. Description of the Prior Art

Today, carpet is one of the most widely used floor coverings. Moreover, carpet is used heavily in both residential and commercial structures.

Most carpet includes a plurality of carpet fibers which extend upward from a carpet base, often referred to as a primary backing, to form a pile fiber carpet surface. Often the carpet fibers are tufted through the carpet base, which is typically a woven or non-woven polymer sheet. The pile fiber carpet surface created by the plurality of carpet fibers extending upward from the carpet base thereby provides a comfortable and durable surface for walking on.

Currently, when old carpet begins to deteriorate due to wear and tear, it is generally pulled up and replaced with new carpet. Further, little, if any, effort is made to reuse or recycle the old carpet. Specifically, most of the old carpet is disposed of in landfills where it remains for many years due to its slow rate of decomposition.

Therefore, a need exists for a process which may be used to reuse or recycle carpet. Accordingly, a process for reutilizing carpet and the product formed by this process are described in detail below.

SUMMARY OF THE INVENTION

In accordance with the teachings of the present invention, a process for resurfacing carpet, is provided. The process generally includes coating the pile fiber carpet surface with a polymer compound.

In one embodiment, the pile fiber carpet surface of the carpet is coated with a thermoplastic material. The coated carpet is then heated to fuse the thermoplastic material to the pile fiber carpet surface. Finally, the coated carpet is cooled to harden the thermoplastic material and form a hardened surface on top of the pile fiber carpet surface.

In another embodiment, the pile fiber carpet surface of the carpet is coated with a thermoset material. For this embodiment, after the thermoset material has cured, a hardened surface is formed on top of the pile fiber carpet surface.

For both embodiments, by using a polymer compound with a high viscosity, a smooth textured hardened surface may be formed. On the other hand, by using a polymer compound with a low viscosity, a rough textured hardened surface may be formed.

The hardened surface produced on top of the pile fiber carpet surface is generally flexible. Therefore, because the hardened surface is generally flexible and has a plurality of carpet fibers positioned directly below it, the resurfaced carpet surface generally provides a cushioned upper surface. As a result of the cushioned upper surface, the resurfaced carpet is generally conducive to reducing the shock experienced in a person's feet, legs, back, etc. due to walking, running, jumping and the like on a hardened surface.

BRIEF DESCRIPTION OF THE DRAWINGS

The accompanying drawings illustrate several presently preferred, but nevertheless illustrate, examples of the present invention and serve to aid in the explanation of the principles of the invention.

DETAILED DESCRIPTION OF PREFERRED EMBODIMENT

Figure 1:
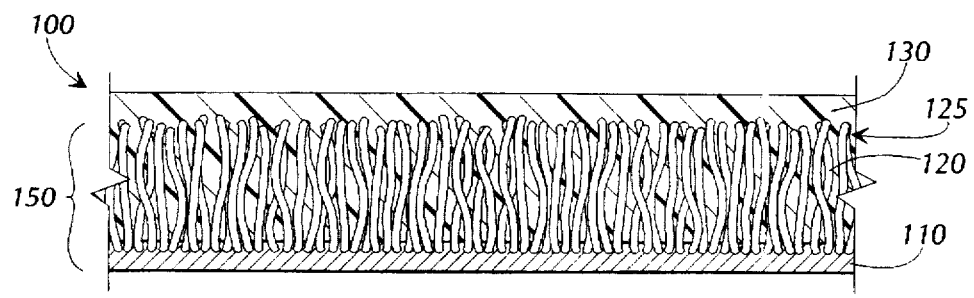
FIG. 1 is an enlarged cross-sectional view of the resurfaced carpet of the present invention with the polymer compound applied to the pile fiber carpet surface.

FIG. 1 illustrates a presently preferred embodiment of the resurfaced carpet 100 of the present invention. As shown, the resurfacing can be applied to any carpet 150 (a roll of carpet, carpet tile, etc.). As shown, most carpet 150 includes a carpet base 110 and a plurality of carpet fibers 120 extending upwardly from the carpet base 110 to form a pile fiber carpet surface 125.

To obtain the resurfaced carpet 100, a polymer compound 130, such as a thermoplastic material or thermoset material, is applied to the pile fiber carpet surface 125. The polymer compound 130 is applied so that the plurality of carpet fibers 120 making up the pile fiber carpet surface 125 are substantially covered. Finally, by the process described for FIGS. 2 and 3, the polymer compound 130 is caused to harden such that the polymer compound 130 adheres to the pile fiber carpet surface 125.

As a result, the polymer compound 130 forms a hardened surface on top of the pile fiber carpet surface 125. This hardened surface is generally suitable for walking, running, jumping and the like, including playing basketball, ping-pong and volleyball.

The hardened surface formed with the polymer compound 130 is also typically flexible. As a result, because the flexible hardened surface is positioned directly on top of the plurality of carpet fibers 125, the resurfaced carpet 100 generally provides a cushioned upper surface. Accordingly, the hardened surface formed with the polymer compound 130 is generally particularly conducive to reducing the shock experienced in a person's feet, legs, back, etc. due to walking, running, jumping and the like on a hardened surface.

The hardened surface formed with the polymer compound 130 is also extremely durable. Therefore, the life expectancy of the resurfaced carpet is typically longer than that of the carpet being resurfaced.

The thermoplastic material is preferably, but not limited to, polyvinyl chloride, polyethylene or polyproylene. On the other hand, the thermoset material is preferably, but not limited to, polyurethene or epoxy. Moreover, of importance, those of ordinary skill in the art will readily recognize that other thermoplastic materials and thermoset materials may be utilized in the present invention.

Figure 4:
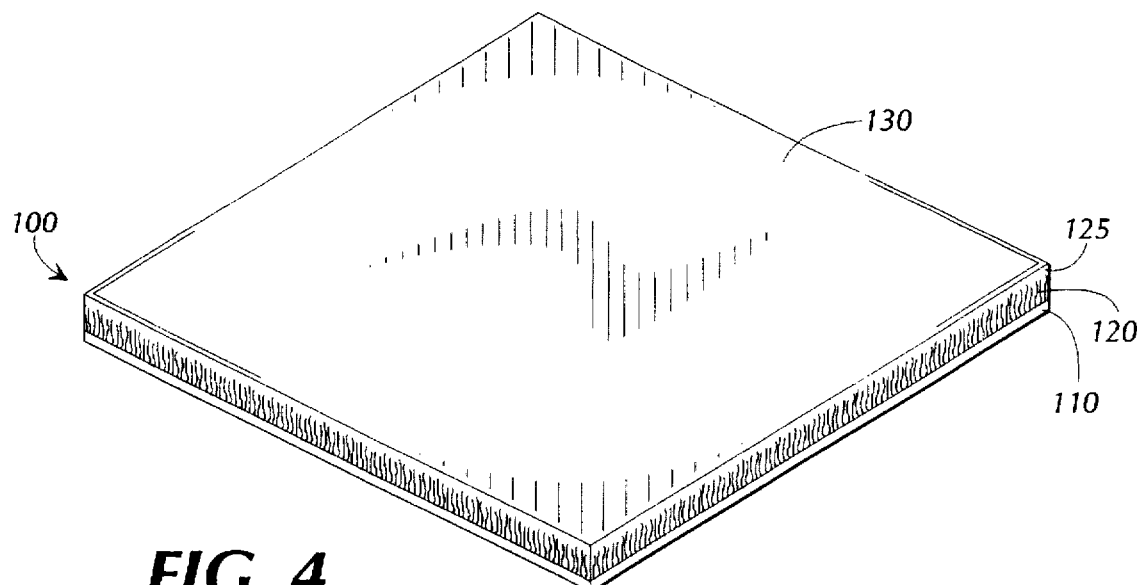
FIG. 4 illustrates the resurfaced carpet of the present invention with a high viscosity polymer compound applied to the pile fiber carpet surface to form a smooth textured hardened surface.
Figure 5:
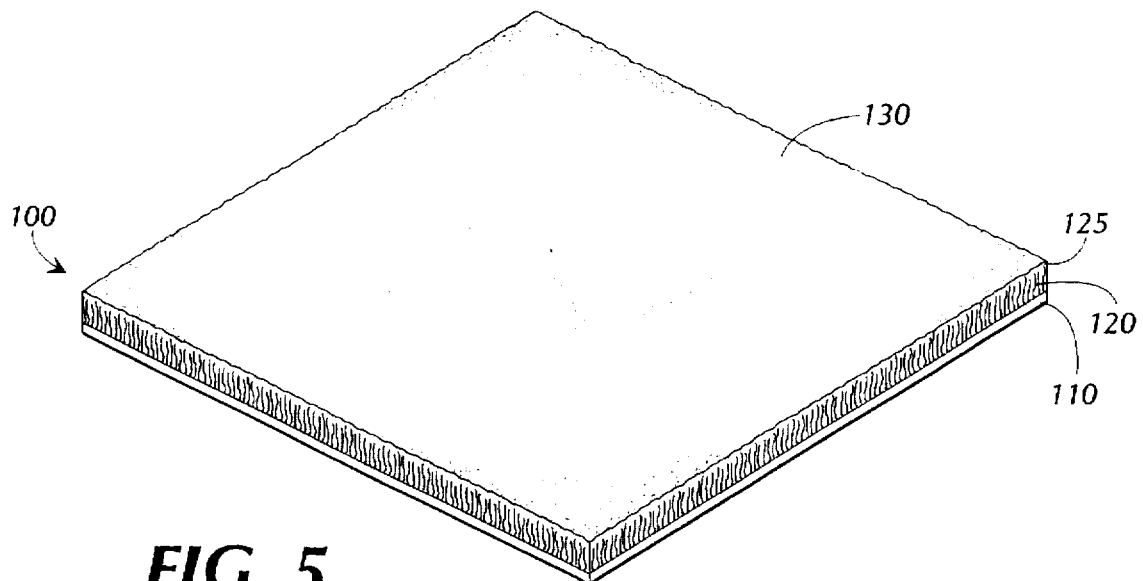
FIG. 5 illustrates the resurfaced carpet of the present invention with a low viscosity polymer compound applied to the pile fiber carpet surface to form a rough textured hardened surface.

Referring to FIGS. 4 and 5, depending on the viscosity of the polymer compound 130, the polymer compound 130 may penetrate voids created between the plurality of carpet fibers 120 to substantially cover one or more of the carpet fibers 120. Further, as is readily understood by one of ordinary skill in the art, if the polymer compound 130 is of a high viscosity, a smooth textured hardened surface, as shown in FIG. 4, is typically formed. On the other hand, if the polymer compound 130 is of a low viscosity, as shown in FIG. 5, a rough textured hardened surface is typically formed.

Figure 2:
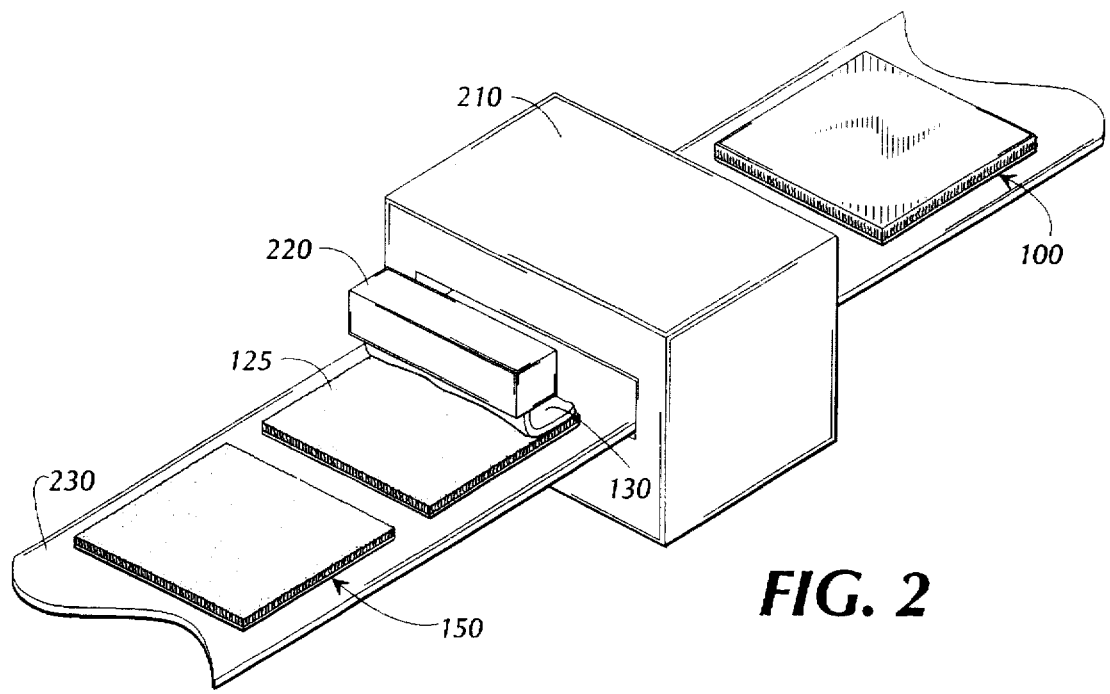
FIG. 2 illustrates the application of a thermoplastic material to the pile fiber carpet surface.
Figure 3:
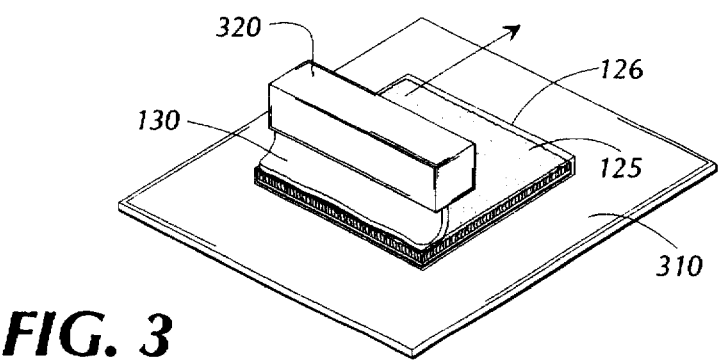
FIG. 3 illustrates the application of a thermoset material to the pile fiber carpet surface.

Referring to FIGS. 2 and 3, the resurfaced carpet 100 of the present invention is preferably formed by coating the pile fiber carpet surface 125 with the polymer compound 130 according to one of the following two processes. These processes include coating the pile fiber carpet surface 125 with the thermoplastic or thermoset polymer compounds 130 and hardening the polymer compound 130 to the pile fiber carpet surface 125.

For both processes, where the old carpet 150 is bigger than a carpet tile, the old carpet 150 may be cut into carpet tiles before being resurfaced. Further, whether the old carpet 150 is already a carpet tile or cut into a carpet tile, the carpet tile may be placed in a mold prior to resurfacing. The mold 126 provides an enclosed structure for coating the polymer compound 130 to the pile fiber carpet surface 125. Accordingly, by using the mold, in addition to other reasons, the polymer compound 130 may be applied to the pile fiber carpet surface 125 in a more uniform manner, especially for a carpet tile, and patterns and the like may also be formed in the hardened surface of the polymer compound 130.

Further, for both processes, the plurality of carpet fibers 120 may be sheered prior to being coated by the polymer compound 130. The sheering of the plurality of carpet fibers 120, in addition to other reasons, allows the height of the resurfaced carpet 100 to be adjusted and also allows portions of the plurality of carpet fibers 120 which are excessively worn or otherwise undesirable to be removed.

Also, for both processes, the polymer compound 130 may be applied to the pile fiber carpet surface 125 at a facility specially equipped to resurface old carpet 150 or at any location where the old carpet 150 is currently located (e.g., where it was originally installed). As is readily evident, the following descriptions illustrate preferred embodiments for resurfacing carpet in a facility equipped to do so.

FIG. 2 illustrates the preferred process for using a thermoplastic material as the polymer compound 130 to resurface the carpet 150. When using the thermoplastic material, an entire roll of carpet, cut portions of the carpet or carpet tiles may be resurfaced with this process.

In a preferred embodiment, the carpet is placed on a conveyor belt 230. The thermoplastic material 130 is then coated onto the pile fiber carpet surface 125 with an applicator 220, and the conveyor belt 230 is used to feed the carpet 150 coated with the polymer compound 130 into a heated oven 210. Inside the heated oven 210, the thermoplastic material 130 is sufficiently heated to gel and fuse to the plurality of carpet fibers 120 so that the thermoplastic material 130 forms to the pile fiber carpet surface 125. The conveyor belt 230 then moves the resurfaced carpet 100 out of the oven where it may be air cooled or water cooled to adhere the polymer compound 130 to the pile fiber carpet surface 125 and form a hardened surface.

As shown in FIG. 3, when using a thermoset material as the polymer compound 130, the entire roll of carpet 150, cut portions of the carpet and carpet tiles are simply placed on a flat surface 310. The thermoset material 130 is then coated onto the pile fiber carpet surface 125 with an applicator 320. After allowing the thermoset material 130 to sufficiently cure and adhere to the pile fiber carpet surface 125, the hardened surface of the resurfaced carpet 100 is formed.

After the hardened surface of the resurfaced carpet 100 is formed with either of the above-described processes, the resurfaced carpet 100 is ready for use. Where the resurfaced carpet 100 is bigger than a carpet tile, the resurfaced carpet 100 may be rolled into resurfaced carpet 100 rolls or cut into resurfaced carpet 100 tiles and stacked.

As one of ordinary skill in the art will readily appreciate, when the pile fibers carpet surface 125 is coated with the polymer compound 130 at the location where the old carpet 150 is currently located other than a facility specifically equipped to resurface carpet 150, such as where the old carpet 150 was installed, the above-described processes can be easily carried out. Specifically, when using a thermoplastic material, some type of external heating source is preferably applied above the pile fiber carpet surface 125 coated with the thermoplastic material to sufficiently heat the polymer compound 130. The resurfaced carpet 100 is then preferably air cooled. Moreover, when using a thermoset material, after a sufficient amount of time, the polymer compound 130 will cure and adhere to the pile fiber carpet surface 125.

As one of ordinary skill in the art will also readily understand, the amount of polymer compound 130 used to resurface a carpet 150 may vary widely depending on the type of final resurfaced carpet 100 desired. Some considerations as to a type of final resurfaced carpet 100 may include, but are not limited to, desired thickness, durability, look and cost. Similarly, when using a thermoplastic material as the polymer compound 130, the temperatures to be applied in heating and cooling the thermoplastic material may vary substantially depending on the specific type of thermoplastic material selected, the consistency of the thermoplastic material, the amount of thermoplastic material applied, etc.

What has been described above are preferred embodiments of the present invention. It is, of course, not possible to describe every conceivable combination of methodologies for purposes of describing the present invention. However, one of ordinary skill in the art will recognize that many further combinations, permutations and modifications of the present invention are possible. Therefore, all such possible combinations, permutations and modifications are to be included within the scope of the claimed invention, as defined by the claims below.

I claim:

1. A process for resurfacing carpet comprising the steps of:

(a) first, placing a section of pile fiber carpet into a mold such that the pile fiber carpet surface is exposed;

(b) coating said pile fiber carpet surface with a polymer compound selected from the group consisting of a thermoplastic material and a thermoset material; and (c) hardening said polymer compound to said pile fiber carpet surface.

2. The process of claim 1, wherein said coating step (a) includes the initial step of selecting a polymer compound with a high viscosity to form a smooth resurfaced carpet.

3. The process of claim 1, wherein said coating step (a) includes the initial step of selecting a polymer compound with a low viscosity to form a textured resurfaced carpet.

4. The process of claim 1, wherein said hardening step (b) includes the step of heating said polymer compound.

5. The process of claim 1, wherein said hardening step (b) includes the step of cooling said polymer compound.

6. The process of claim 4, wherein said heating step of said hardening step (b) includes feeding the pile carpet surface coated with said polymer compound into a heated oven.

7. The process of claim 6, said process further comprising the initial step of placing said pile fiber carpet surface on a conveyor belt for feeding the pile fiber carpet surface coated with said polymer compound into the heated oven.

8. The process of claim 4, wherein said heating step of said hardening step (b) includes heating the polymer compound until the polymer compound forms to said pile fiber carpet surface.

9. The process of claim 1, said process further comprising the initial step of cutting said pile fiber carpet surface into carpet tiles.

10. The process of claim 1, wherein said hardening step (b) includes the step of allowing said polymer compound to cure.

11. The process of claim 1, further comprising:

(c) rolling the resurfaced carpet into rolls.

12. The process of claim 1, further comprising:

(c) cutting the resurfaced carpet into tiles.

* * * * *